Oct. 24, 1950     J. F. SMITH     2,526,705
PARACHUTE HARNESS FASTENER
Filed Nov. 2, 1945

INVENTOR.
JOSEPH F. SMITH
BY
Raymond J Brosley
ATTORNEYS

Patented Oct. 24, 1950

2,526,705

UNITED STATES PATENT OFFICE 2,526,705

PARACHUTE HARNESS FASTENER

Joseph F. Smith, Rochester, N. Y.

Application November 2, 1945, Serial No. 626,412

1 Claim. (Cl. 24—230)

(Granted under the act of March 3, 1883, as amended April 30, 1928; 370 O. G. 757)

The invention described herein may be manufactured and used by or for the Government for governmental purposes without payment to me of any royalty thereon.

This invention relates to a fastener for a parachute harness.

An object of the invention is to provide a fastener for a parachute harness that will permit rapid release of the harness from the body of the wearer.

In use, it has been found that when landing by parachute, particularly over water, it is essential that the parachute harness be quickly removed from the body of the wearer to avoid the impediment of the parachute. To obtain this result, it is necessary that a readily operable and quickly releasable fastener be provided without sacrifice of the strength of the fastener.

It is an object of this invention to provide a strong fastener that will withstand the strain of the parachute opening and that may be disengaged quickly and with a minimum effort on the part of the wearer.

The above and other objects will be apparent from the following description and illustrated in the accompanying drawing wherein.

Figure 1:
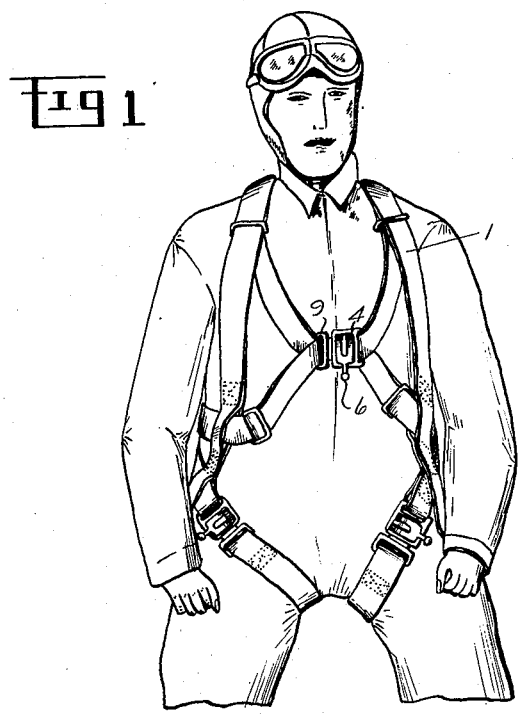
Fig. 1 shows the fastener applied to a harness on the body of the wearer.
Figure 2:
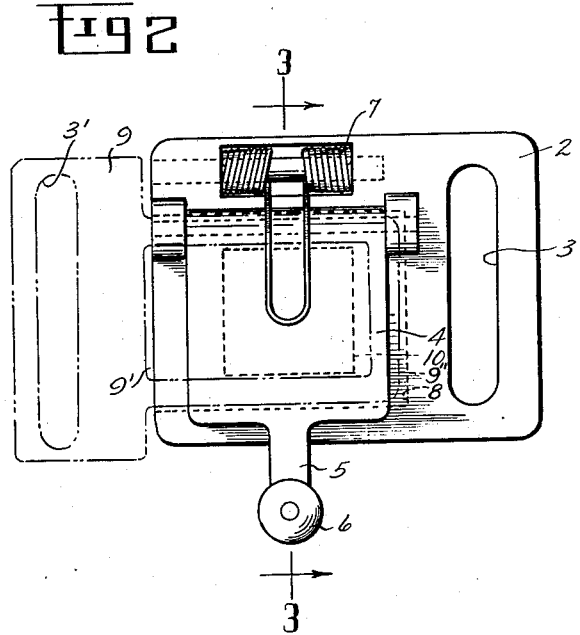
Fig. 2 is a front elevational view of the fastener in locked position.
Figure 3:
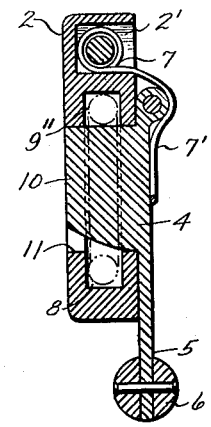
Fig. 3 is a cross-sectional view taken on line 3—3 of Fig. 2 looking in the direction of the arrows.

Referring now more particularly to the drawing, numeral 1 designates a conventional parachute harness of any desired construction. The frame 2 of the fastener has the aperture 3 through which the harness strap is threaded. Pivotally mounted on the frame 2 is the locking member 4 having the handle 5 and the grip 6 extending downwardly therefrom beyond said frame. A spring 7 is seated in a depression 2' of the frame 2 which has the extended spring arm 7' which applies pressure to the locking member 4 to maintain the same in locked position. The frame 2 has a channel or slot 8 therein, in which a tongue 9" of the male member 9 of the fastener seats. The locking member 4 has the integral projection or lug 10 which is tapered upwardly from the handle 5 and which is flush with the surface of the frame 2. The frame 2 has the transverse aperture 11 to receive the projection 10. The tongue 9" of said member 9 has a transverse aperture 9' arranged to be placed in registry with the aperture 11, and said member 9 has the aperture 3' to receive the harness strap of the harness 1.

When it is desired to fasten the harness, the locking member 4 is manually raised by means of the grip 6 and the tongue 9" of the male member 9 is inserted into the slot 8 of the frame 2, and the grip 6 released permitting the spring arm 7' to act against the locking member 4 forcing the projection 10 through the aperture 11 of the frame 2 and the aperture 9' of the male member 9. When it is desired to release the fastener to remove the harness, a single movement of one hand on the grip 6 of each fastener will move the locking member 4 out of locking engagement with the male member 9, permitting the tongue 9" of the male member 9 to move out of the slot 8 and the harness to be removed.

Having thus described my invention, what I claim as new and desire to secure by Letters Patent of the United States is:

A fastener for fastening together two strap ends in a parachute harness, which comprises a frame, a male member, the outer ends of both said parts being provided with belt slots elongated in the direction of the width of said parts and extending throughout their thickness for receiving and retaining the strap ends, the inner ends of said parts being provided, the frame with a channel or slot which is rectangular in length, width and thickness extending endwise into said inner end, and the male member being provided with a tongue which fits freely into the said channel or slot, said frame and the tongue of said male member having aligned rectangular transverse openings throughout their thickness when assembled, a locking member hingedly supported near the longer edge of said frame the axis of the hinge extending lengthwise of the frame, said locking member including a lug positioned to swing into said aligned rectangular transverse openings, a torsion coil spring in a cavity alongside said hinge axis in said frame, said spring having an integral torque arm bearing on and yieldably maintaining said locking member in locked position and said lug entered, and a handle on said locking member extending beyond the edge of said frame for opening said locking member and withdrawing said lug, whereby the frame and said male member may be separated.

JOSEPH F. SMITH.

REFERENCES CITED

The following references are of record in the file of this patent:

UNITED STATES PATENTS

| Number | Name | Date |
|---|---|---|
| 408,308 | Keller | Aug. 6, 1889 |
| 508,752 | Prahar | Nov. 14, 1893 |
| 1,807,293 | Keller | May 26, 1931 |
| 1,920,408 | Lafayette | Aug. 1, 1933 |

FOREIGN PATENTS

| Number | Country | Date |
|---|---|---|
| 435,459 | France | Dec. 26, 1911 |